United States Patent
Sogawa et al.

(10) Patent No.: US 6,351,444 B1
(45) Date of Patent: Feb. 26, 2002

(54) PICKUP DEVICE WITH TILT ADJUSTING MECHANISM

(75) Inventors: Teruaki Sogawa; Takayuki Murakami, both of Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/506,450

(22) Filed: Feb. 18, 2000

(30) Foreign Application Priority Data

Feb. 22, 1999 (JP) .............................. 11-043679

(51) Int. Cl.[7] ........................ G11B 21/02; G11B 17/00; G11B 21/16
(52) U.S. Cl. ........................... 369/219; 369/249
(58) Field of Search ................... 369/219, 220, 369/44.21, 249, 215, 244, 255

(56) References Cited

U.S. PATENT DOCUMENTS 5,933,406 A * 8/1999 Ikegame ..................... 369/247
5,982,735 A * 11/1999 Tsai ............................ 369/219
5,995,479 A * 11/1999 Takizawa et al. ............ 369/219

FOREIGN PATENT DOCUMENTS

| JP | 5-74067 | * 3/1992 |
| JP | 6-11166 | 2/1994 |
| JP | 3000250 | 5/1994 |
| JP | 8-36848 | 2/1996 |

* cited by examiner

Primary Examiner—Brian E. Miller
Assistant Examiner—Julie Anne Watko
(74) Attorney, Agent, or Firm—Morgan, Lewis & Bockius LLP (57) ABSTRACT

A pickup device including a movable frame that holds a pickup, and a main shaft and a sub shaft that guide travelling of the movable frame. The other end portion of the main shaft, and one and the other portions of the sub shaft are attached to a support frame via tilt adjusting mechanisms, respectively. The tilt adjusting mechanisms each includes a rising end face, a spring member which always elastically urges the end portion of the shaft in an upward direction, a countersunk head screw, and a tapped hole into which the countersunk head screw is to be screwed.

2 Claims, 5 Drawing Sheets

PICKUP DEVICE WITH TILT ADJUSTING MECHANISM

BACKGROUND OF THE INVENTION

1. Field of the Invention

The present invention relates to a pickup device, and more particularly to a pickup device which is used for performing recording and reproducing operations on a DVD, a CD-ROM, an MD, or the like.

2. Description of the Related Art

A pickup device of this kind comprises: a movable frame that holds a pickup; and a guide shaft that guides travelling of the movable frame in directions along which the movable frame approaches and separates from a disk table. Rotational motion of a travel driving motor is converted into linear motion of the movable frame by a pinion and rack mechanism or the like. Generally, the guide shaft is configured by a main shaft and a sub shaft which are attached to a support frame (chassis).

Such a pickup device is disclosed in Japanese Patent Unexamined Publication No. Hei. 8-36848. In the disclosed pickup device, a main shaft and a sub shaft which serve as a guide shaft are fixed in a state where end portions of the shafts are pressed by a plate face of a support frame, a perpendicular rising end face disposed on the support frame, and the head or the shaft of a head screw which is screwed into a tapped hole of the support frame.

On the other hand, it is desired to configure a pickup device of the above-mentioned kind so that a beam output from a pickup perpendicularly impinges on a recording plane of a disk which is mounted on a disk table. In order to satisfy this request, tilt adjustment must be performed by a tilt adjusting mechanism. In one of means for performing tilt adjustment, end portions of the above-mentioned main and sub shafts are vertically moved with respect to the support frame to finely adjust the tilts of the shafts. As a tilt adjusting mechanism using such means, conventionally, known is a mechanism which is schematically shown in FIG. 6.

Figure 6:
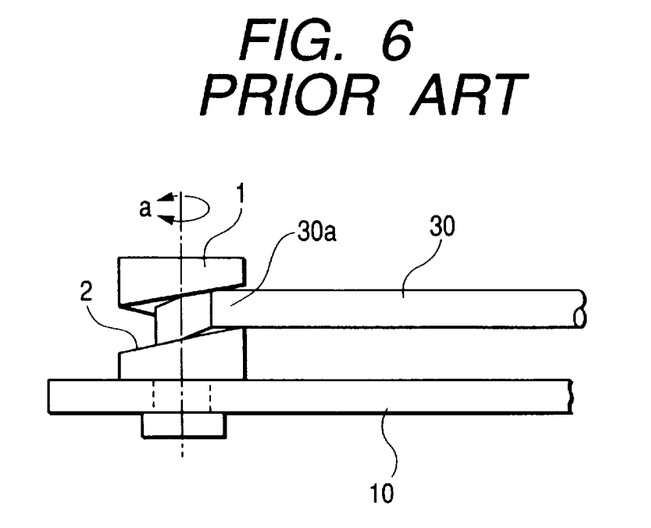
FIG. 6 is a diagram showing a tilt adjusting mechanism which is used in a conventional pickup device.

The tilt adjusting mechanism of FIG. 6 has a structure in which a post 1 having a spiral cam groove 2 is attached to a support frame 10, and an end portion 30a of a guide shaft 30 such as a main shaft or a sub shaft is fitted into the cam groove 2, thereby holding the guide shaft. In the tilt adjusting mechanism, when the post 1 is rotated about the axis as indicated by the arrow a, the end portion 30a of the guide shaft 30 is vertically moved while being guided by the cam groove 2, whereby the tilt of the guide shaft 30 with respect to the support frame 10 can be finely adjusted so as to perform tilt adjustment.

However, the tilt adjusting mechanism shown in FIG. 6 has a problem in that the post 1 which is precisely machined must be used and hence the production cost is high. In the above-mentioned pickup device which is disclosed in Japanese Patent Unexamined Publication No. Hei. 8-36848, there is a problem in that tilt adjustment cannot be performed by means for finely adjusting the tilt of the guide shaft with respect to the support frame.

SUMMARY OF THE INVENTION

The invention has been made in view of the above problems. It is an object of the invention to provide a pickup device comprising a tilt adjusting mechanism in which means for finely adjusting a tilt of a guide shaft with respect to a support frame can be used to perform tilt adjustment, and the production cost can be easily lowered.

It is another object of the invention to provide a pickup device comprising a tilt adjusting mechanism in which tilt adjustment can be surely performed.

The pickup device of the invention comprises: a movable frame that holds a pickup; and a guide shaft that guides travelling of the movable frame in directions along which the movable frame approaches and separates from a disk table. As described at the beginning of the description, when rotational motion of a travel driving motor is converted into linear motion of the movable frame by a pinion and rack mechanism or the like, therefore, the movable frame travels in the approaching and separating directions with respect to the disk table along the guide shaft. Generally, the guide shaft is configured by a main shaft and a sub shaft which are attached to a support frame.

The pickup device of the invention comprises a tilt adjusting mechanism which can finely adjust a tilt of the guide shaft with respect to the support frame. The tilt adjusting mechanism comprises: a flat rising end face that is disposed on the support frame and that is perpendicular to a plate face of the support frame; a spring member that is held by the support frame, that is contacted at a straight tip end portion to an end portion of the guide shaft to always elastically urge the end portion of the guide shaft in an upward direction along which the end portion separates from the plate face of the support frame; a head screw including a head, the head having a downward-tapered pressing face which is contacted to the end portion of the guide shaft that is elastically urged in the upward direction by the spring member, which cooperates with the tip end portion and the rising end face of the spring member to pressingly hold the end portion of the guide shaft, and which enables the end portion of the guide shaft to be pressed down while causing the end portion to slide over the rising end face; and a tapped hole which is formed in the support frame, and into which the head screw is screwed, thereby supporting the head screw in parallel with the rising end face.

In the pickup device of the invention comprising such a tilt adjusting mechanism, the flat rising end face which perpendicularly rises from the plate face of the support frame performs a function of guiding vertical motion of the end portion of the guide shaft. When the head screw is rotated in a fastening direction (forward direction) to be screwed into the tapped hole of the support frame, the pressing face of the head of the head screw presses down the end portion of the guide shaft against the urging exerted by the spring member to downward move the end portion. In contrast, when the head screw is rotated in a loosening direction (reverse direction) to be unscrewed from the tapped hole, the end portion of the guide shaft is pushed up to be upward moved by the urging of the spring member while being contacted to the pressing face, as the pressing face is raised. Therefore, the end portion of the guide shaft is vertically moved by only rotating the head screw in the forward or reverse direction, whereby the tilt of the guide shaft with respect to the support frame is finely adjusted. In the tilt adjusting mechanism, it is not necessary to use the expensive post 1 which has been described with reference to FIG. 6.

In the pickup device of the invention, preferably, the guide shaft is configured by a main shaft and a sub shaft, a position of one end portion of the main shaft is set as a reference position, and another end portion of the main shaft and at least one of one and another end portions of the sub shaft are attached to the support frame via the tilt adjusting mechanism. In the thus configured pickup device, the other end portion of the main shaft can be vertically moved with respect to the one end portion of the main shaft which is set as the reference position, so as to finely adjust the tilt of the main shaft, and the one and/or other end portion of the sub shaft can be vertically moved so as to finely adjust the tilt of the sub shaft. Therefore, the workability of tilt adjustments of the main and sub shafts can be improved.

Preferably, the pickup device of the invention is configured so that the other end portion of the main shaft and the other end portion of the sub shaft are attached to the support frame via the tilt adjusting mechanism, the spring member has: a coil portion which is fittingly supported by an attaching piece disposed on the support frame; and a pair of the tip end portions which are respectively extended in opposite directions from a winding start and a winding end of the coil portion, one of the tip end portions is contacted to the other end portion of the main shaft, and the other of the tip end portions is contacted to the other end portion of the sub shaft. According to this configuration, the single spring member is commonly used in the tilt adjusting mechanism for attaching two shafts, i.e., the main shaft and the sub shaft to the support frame. Therefore, the number of parts is reduced and the production cost can be easily reduced.

In the tilt adjusting mechanism used in the pickup device of the invention, positional relationships among the tip end portion of the spring member, the rising end face, and the head screw may be set in one of the following manners.

In one manner, the tip end portion of the spring member straight elongates from a side of the head screw screwed into the tapped hole toward the rising end face while passing below the end portion of the guide shaft and inclined to be lowered as elongating. In the other manner, the tip end portion of the spring member straight elongates from a side of the rising end face toward the head screw screwed into the tapped hole while passing below the end portion of the guide shaft and inclined to be lowered as elongating.

In both the cases, tilt adjustment can be performed. In the latter case, or in the mechanism where the tip end portion of the spring member straight elongates from the side of the rising end face toward the head screw while passing below the end portion of the guide shaft and inclined to be lowered as elongating, particularly, the urging force of the spring member acts in the direction along which the end portion of the guide shaft is separated from the rising end face, and does not act in the direction along which the end portion is pressed against the rising end face. When the head screw is rotated in the reverse direction to raise the pressing face, therefore, there never arises a phenomenon that the end portion of the guide shaft is pressingly fixed by the tip end portion of the spring member and the rising end face and the pressing face is kept to be separated from the end portion of the guide shaft (hereinafter, such a phenomenon is referred to as "block phenomenon"). This serves to improve the reliability of tilt adjustment. When the head screw is rotated in the forward direction to lower the end portion of the guide shaft, the downward-tapered pressing face disposed on the head of the head screw functions to press the end portion of the guide shaft against the rising end face, thereby increasing the frictional force exerted between the rising end face and the end portion of the guide shaft. At this time, the rotation of the head screw for lowering the end portion of the guide shaft is manually performed, and hence there never arises a situation where the increase of the frictional force causes the end portion of the guide shaft to be pressingly held and fixed by the pressing face and the rising end face.

In the former case, or in the mechanism where the tip end portion of the spring member straight elongates from the side of the head screw toward the rising end face while passing below the end portion of the guide shaft and inclined to be lowered as elongating, it is preferable to set the tilt angle of the tip end portion of the spring member with respect to the rising end face to an angle at which the end portion of the guide shaft cannot be pressingly fixed by only the tip end portion and the rising end face. According to this configuration, even when the tip end portion of the spring member straight elongates from the side of the head screw toward the rising end face while passing below the end portion of the guide shaft and inclined to be lowered as elongating, the block phenomenon does not occur.

As the head screw, a countersunk head screw may be used. In this case, the pressing face is formed by a lower face of a head of the countersunk head screw. In a countersunk head screw, the lower face of the head is inclined in a downward-tapered manner, and the lower face is inclined by 45 deg. or about 45 deg. with respect to the axis. Therefore, the function which should be performed by the pressing face, i.e., the function of "pressing down the end portion of the guide shaft while causing the end portion to slide over the rising end face" can be attained by the lower face of the head of the countersunk head screw.

DETAILED DESCRIPTION OF THE PREFERRED EMBODIMENTS

Figure 1:
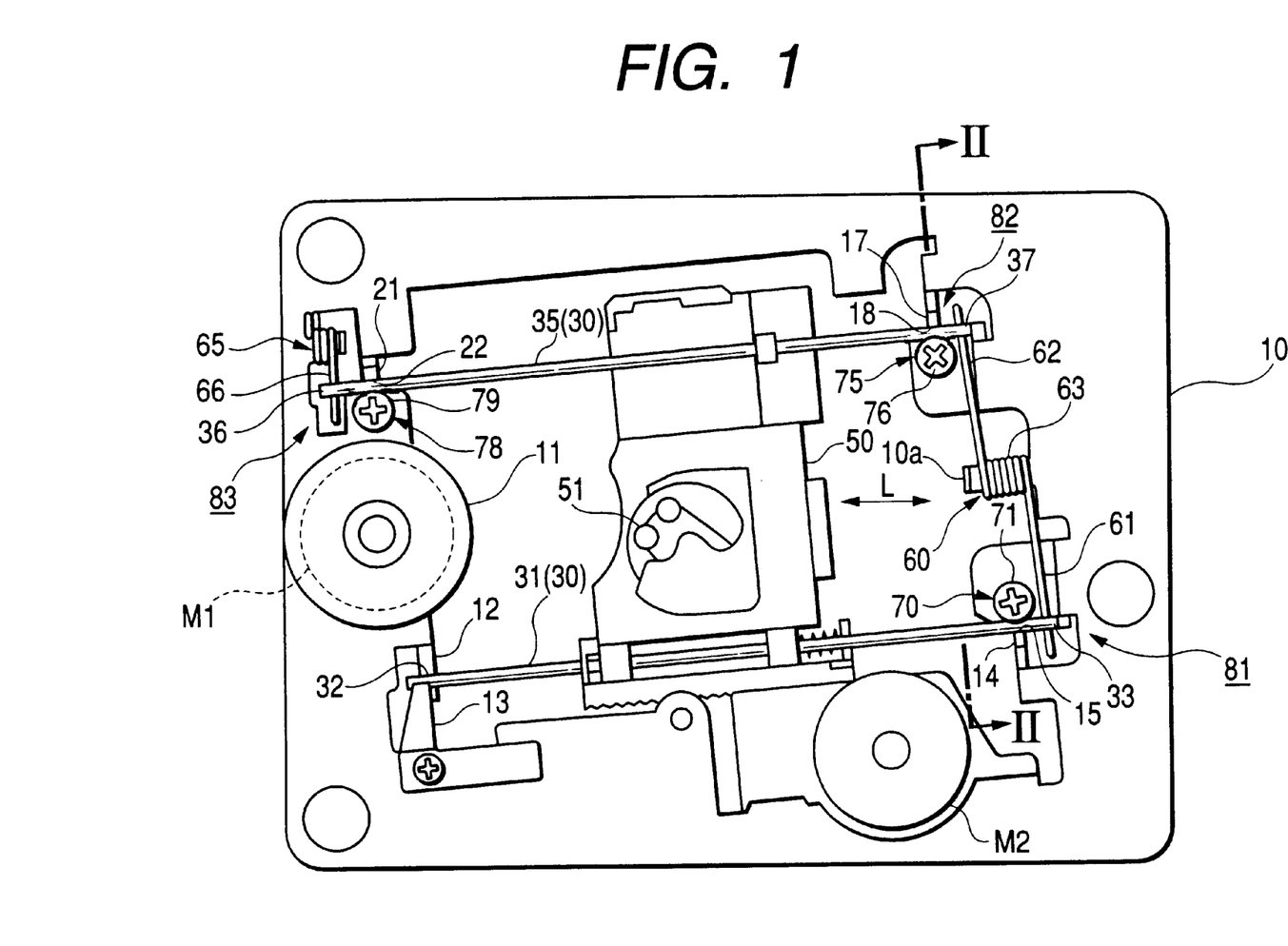
FIG. 1 is a schematic plan view showing an embodiment of the pickup device of the invention.
Figure 2:
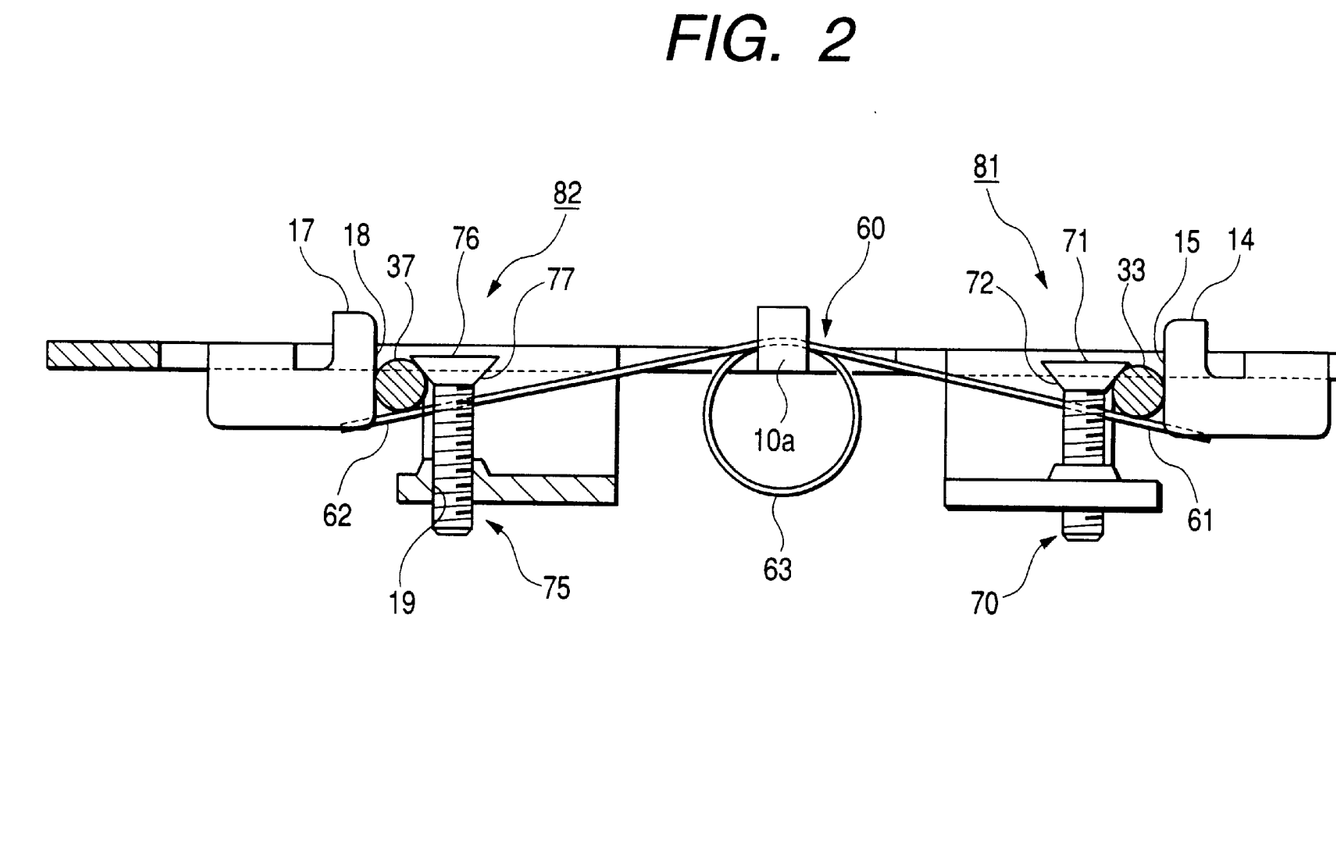
FIG. 2 is an enlarged section view taken along the line II—II of FIG. 1.
Figure 3:
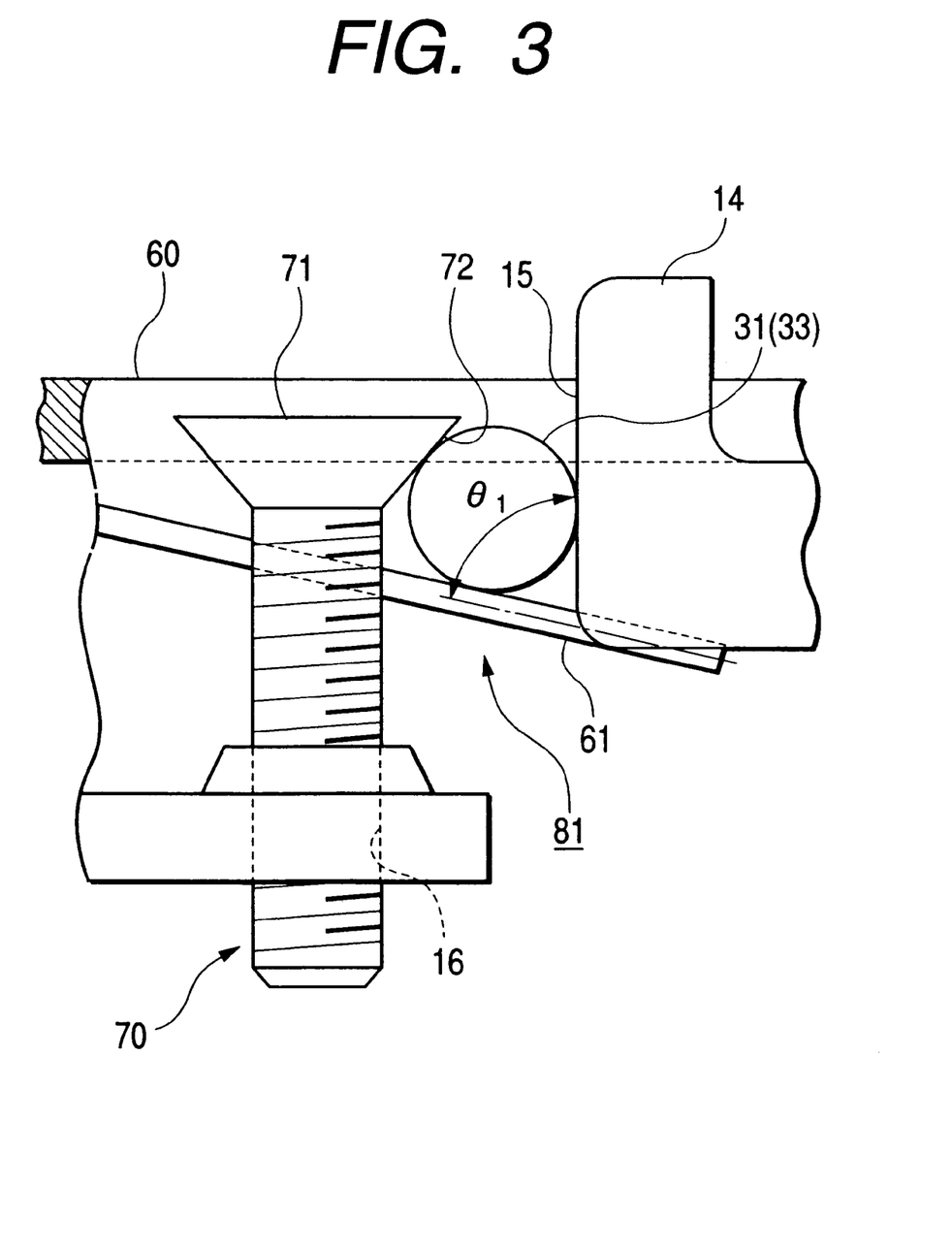
FIG. 3 is a diagram enlargedly showing main portions of FIG. 2.

FIG. 1 is a schematic plan view showing an embodiment of the pickup device of the invention, FIG. 2 is an enlarged section view taken along the line II—II of FIG. 1, and FIG. 3 is a diagram enlargedly showing main portions of FIG. 2.

As shown in FIG. 1, a support frame 10 of the pickup device is formed into a rectangular frame-like shape. A motor M1 is placed in an appropriate position in one end side in the longitudinal direction of the support frame 10. A disk table 11 is attached to the rotation shaft of the motor M1. Main and sub shafts 31 and 35 serving as a guide shaft 30 are placed on both the sides of the disk table 11, respectively. Travelling of a movable frame 50 holding a pickup 51 is guided by the main and sub shafts 31 and 35 in directions (indicated by the arrows L) along which the movable frame approaches and separates from the disk table 11. A travel driving motor M2 is placed in another position of the support frame 10. Rotational motion of the motor M2 is converted into linear motion of the movable frame 50 by a gear group, a pinion and rack mechanism, and the like.

Next, the structure of attaching the main and sub shafts 31 and 35 to the support frame 10 will be described with reference to FIGS. 1 to 3.

As shown in FIG. 1, one end portion 32 of the main shaft 31 is pressingly fixed to the support frame 10 by a shaft receiving piece 12 disposed on the support frame 10, and an elastic pressing piece 13 fixed to the support frame 10. A flexible adhesive agent is applied to the fixing position. Therefore, the main shaft 31 is swingable about the one end portion 32 functioning as the fulcrum, but the position of the one end portion 32 with respect to the support frame 10 is fixed to a constant position. In other words, the one end portion 32 of the main shaft 31 is set as a reference position for tilt adjustment.

As shown in FIGS. 1 to 3, the other end portion 33 of the main shaft 31 is attached to the support frame 10 in a state where the end portion is pressingly held by the cooperation of: a flat rising end face 15 formed by an end face of a rising piece 14 disposed on the support frame 10; one tip end portion 61 of a spring member 60 configured by a torsion coil spring; and a pressing face 72 of the head 71 of a head screw 70. As shown in FIG. 3, the rising end face 15 is formed as a flat face which is perpendicular to the plate face of the support frame 10. The head screw 70 is screwed into a tapped hole 16 formed in the support frame 10 so as to be supported in parallel with the rising end face 15. As the head screw 70, used is a general-purpose countersunk head screw. Therefore, the lower face of the head 71 is downward-tapered so as to have an inclination angle of 45 deg. or about 45 deg. with respect to the axis. The lower face is used as the pressing face 72.

In contrast, the other end portion 37 of the sub shaft 35 is attached to the support frame 10 in a state where the end portion is pressingly held by the cooperation of: a flat rising end face 18 formed by an end face of a rising piece 17 disposed on the support frame 10; the other tip end portion 62 of the spring member 60; and a pressing face 77 of the head 76 of a head screw 75. As shown in FIG. 3, the rising end face 18 is formed as a flat face which is perpendicular to the plate face of the support frame 10. The head screw 75 is screwed into a tapped hole 19 formed in the support frame 10 so as to be supported in parallel with the rising end face 18. As the head screw 75, used is a general-purpose countersunk head screw. Therefore, the lower face of the head 71 is downward-tapered so as to have an inclination angle of 45 deg. or about 45 deg. with respect to the axis. The lower face is used as the pressing face 77.

In the spring member 60, as shown in FIGS. 1 and 2, a coil portion 63 is fittingly supported by an attaching piece 10a disposed on the support frame 10. The tip end portion 61 which extends from the winding start of the coil portion 63 straight elongates from the side of the head screw 70 toward the rising end face 15 while passing below the other end portion 33 of the main shaft 31 and inclined to be lowered as elongating. In contrast, the other tip end portion 62 which extends from the winding end of the coil portion 63 straight elongates from the side of the head screw 75 toward the rising end face 18 while passing below the other end portion 37 of the sub shaft 35 and inclined to be lowered as elongating. The tip end portion 61 of the spring member 60 is elastically contacted to the other end portion 33 of the main shaft 31 to elastically urge the other end portion 33 in the upward direction, and the other tip end portion 62 is elastically contacted to the other end portion 37 of the sub shaft 35 to elastically urge the other end portion 37 in the upward direction.

As shown in FIG. 1, the one end portion 36 of the sub shaft 35 is attached to the support frame 10 in a state where the end portion is pressingly held by the cooperation of: a flat rising end face 22 formed by an end face of a rising piece 21 disposed on the support frame 10; a tip end portion 66 of a spring member 65 configured by a torsion coil spring supported by the support frame 10; and a pressing face (not shown) of the head 79 of a head screw 78. The rising end face 22 is formed as a flat face which is perpendicular to the plate face of the support frame 10. The head screw 78 is screwed into a tapped hole (not shown) formed in the support frame 10 so as to be supported in parallel with the rising end face 22. As the head screw 78, used is a general-purpose countersunk head screw. Therefore, the lower face of the head 79 is downward-tapered so as to have an inclination angle of 45 deg. or about 45 deg. with respect to the axis. The lower face is used as the pressing face.

The mechanism which attaches the other end portion 33 of the main shaft 31 to the support frame 10, that which attaches the other end portion 37 of the sub shaft 35 to the support frame 10, and that which attaches the one end portion 36 of the sub shaft 35 to the support frame 10 form respective tilt adjusting mechanisms 81, 82, and 83. The spring member 60 is commonly used in the former two tilt adjusting mechanisms 81 and 82. In all the three tilt adjusting mechanisms 81, 82, and 83, positional relationships among the tip end portions 61, 62, and 66 of the spring members 60 and 65, the rising end faces 15, 18, and 22, and the head screws 70, 75, and 78 are set to be identical with one another. Namely, the tip end portions 61, 62, and 66 of the spring members 60 and 65 straight elongate from the sides of the head screws 70, 75, and 78 toward the rising end faces 15, 18, and 22 while passing below the main shaft 31 or the sub shaft 35 and inclined to be lowered as elongating, respectively.

Next, the function of the tilt adjusting mechanism 81 which attaches the other end portion 33 of the main shaft 31 to the support frame 10 will be described with reference mainly to FIG. 3.

In the tilt adjusting mechanism 81, the rising end face 15 performs a function of guiding vertical motion of the other end portion 33 of the main shaft 31. When the head screw 70 is rotated in the forward direction to be screwed into the tapped hole 16, therefore, the pressing face 72 of the head screw 70 presses down the other end portion 33 of the main shaft 31 against the urging exerted by the tip end portion 61 of the spring member 60 to downward move the end portion. In contrast, when the head screw 70 is rotated in the reverse direction to be unscrewed from the tapped hole 16, the other end portion 33 of the main shaft 31 is pushed up to be upward moved by the urging of tip end portion 61 of the spring member 60 while being contacted to the pressing face 72 of the head screw, as the pressing face 72 of the head screw 70 is raised. Therefore, the other end portion of the main shaft 31 is vertically moved by only rotating the head screw 70 in the forward or reverse direction, whereby the tilt of the main shaft 31 with respect to the support frame 10 is finely adjusted.

In a mechanism such as the tilt adjusting mechanism 81 where the tip end portion 61 of the spring member 60 straight elongates from the side of the head screw 70 toward the rising end face 15 while passing below the other end portion 33 of the main shaft 31 and inclined to be lowered as elongating, it is preferable to set the tilt angle $\theta 1$ of the tip end portion 61 of the spring member 60 with respect to the rising end face 15 to an angle at which the other end portion 33 of the main shaft 31 cannot be pressingly fixed by only the tip end portion 61 and the rising end face 15. In order to satisfy this condition, it is required to set the tilt angle $\theta 1$ to be $45° < \theta 1 < 90°$. In the mechanism which is configured in this way, when the head screw 70 is rotated in the reverse direction to raise the pressing face 72, there never arises the phenomenon, i.e., the block phenomenon that the other end portion 33 of the main shaft 31 is pressingly fixed by the tip end portion 61 of the spring member 60 and the rising end face 15 and the pressing face 72 is kept to be separated from the other end portion 33 of the main shaft 31. This serves to improve the reliability of tilt adjustment. The above is applicable also to the other tilt adjusting mechanisms 82 and 83.

Also in the other tilt adjusting mechanisms 82 and 83, when the same operations as those which have been described above in conjunction with the tilt adjusting mechanism 81 are performed, the tilt of the sub shaft 35 is finely adjusted.

In this embodiment, the position of the one end portion 32 of the main shaft 31 is set as the reference position, and the other end portion 33 of the main shaft 31 and the one and other end portions 36 and 37 of the sub shaft 35 are attached to the support frame 10 via the respective tilt adjusting mechanisms 81, 82, and 83. With respect to the one end portion 32 of the main shaft 31 which is set as the reference position, therefore, the tilt of the main shaft 31 can be finely adjusted by vertically moving the other end portion 33 of the main shaft, and that of the sub shaft 35 can be finely adjusted by vertically moving the one and other end portions 36 and 37 of the sub shaft 35. As a result, tilt adjustments of the main and sub shafts 31 and 35 can be performed with excellent workability.

Figure 4:
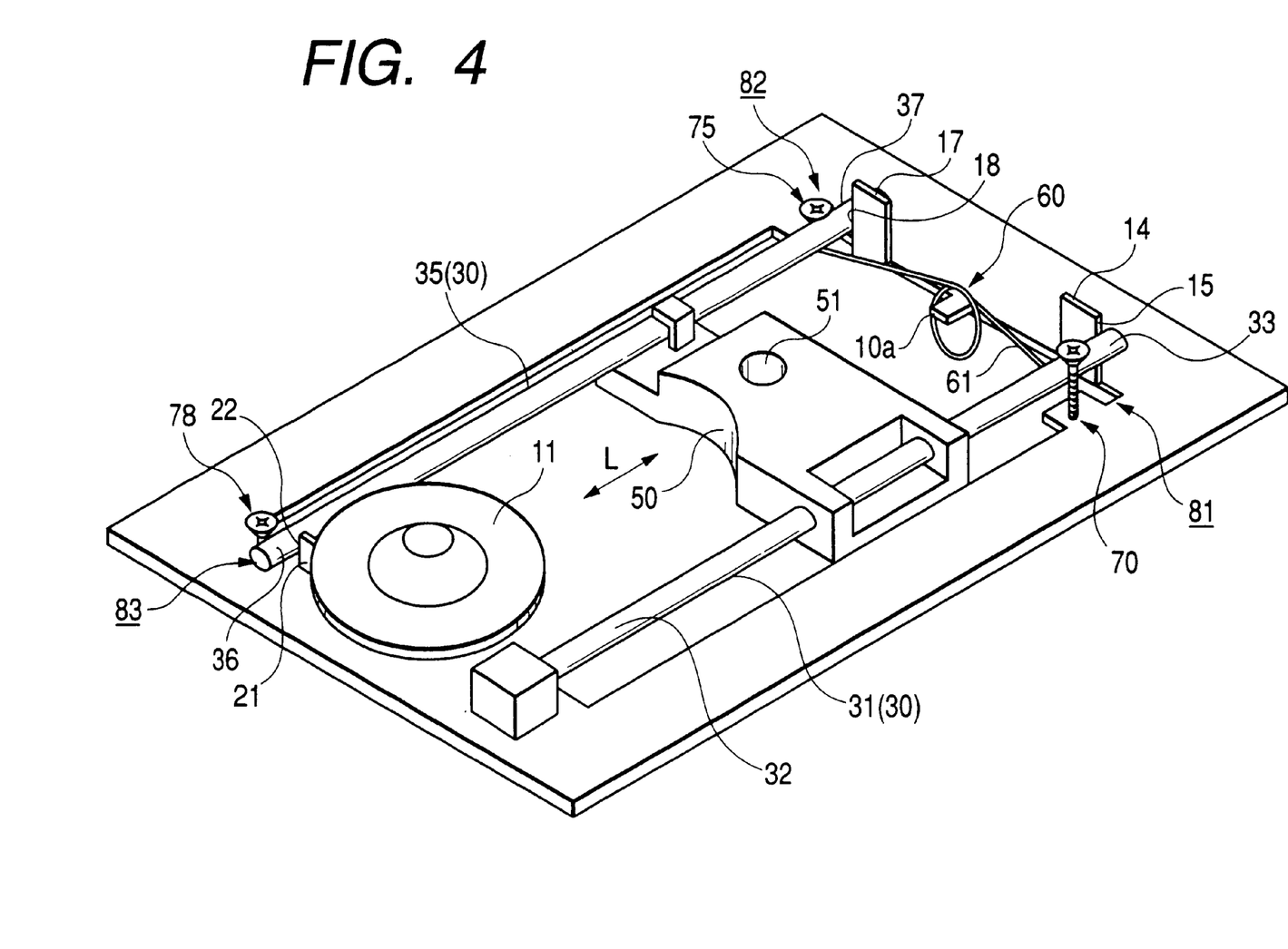
FIG. 4 is a schematic perspective view showing another embodiment of the pickup device of the invention.
Figure 5:
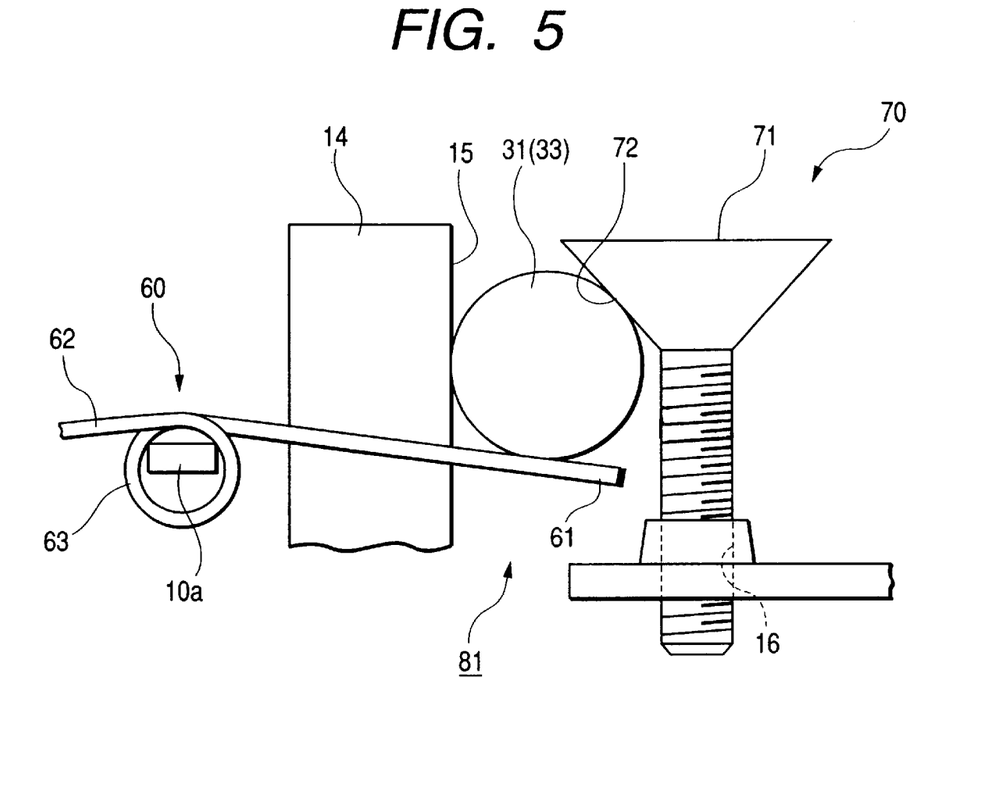
FIG. 5 is a diagram schematically showing the configuration of a tilt adjusting mechanism which is used in the pickup device of FIG. 4.

FIG. 4 is a schematic perspective view showing another embodiment of the pickup device of the invention, and FIG. 5 is a diagram schematically showing the configuration of the tilt adjusting mechanism 81 which is used in the pickup device and for the other end portion 33 of the main shaft 31.

Also in the pickup device, the one end portion 32 of the main shaft 31 is set as a reference position, and the other end portion 33 of the main shaft 31 and the one and other end portions 36 and 37 of the sub shaft 35 are attached to the support frame 10 via the respective tilt adjusting mechanisms 81, 82, and 83.

The tilt adjusting mechanism 81 which is used in the pickup device of this embodiment and for the other end portion 33 of the main shaft 31 is essentially different from the tilt adjusting mechanism 81 which has been described with reference to FIGS. 1 to 3, in the following point. In the tilt adjusting mechanism 81 which is shown in FIGS. 4 and 5 and used for the other end portion 33 of the main shaft 31, the one tip end portion 61 of the spring member 60 straight elongates from the side of the rising end face 15 toward the head screw 70 while passing below the other end portion 33 of the main shaft 31 and inclined to be lowered as elongating.

In the thus configured tilt adjusting mechanism 81, the urging force of the tip end portion 61 of the spring member 60 acts in the direction along which the other end portion 33 of the main shaft 31 is separated from the rising end face 15, and does not act in the direction along which the other end portion 33 is pressed against the rising end face 15. Irrespective of the degree of the tilt angle of the tip end portion 61 of the spring member 60, when the head screw 70 is rotated in the reverse direction to raise the pressing face 72, therefore, there never arises the block phenomenon that the other end portion 33 of the main shaft 31 is pressingly fixed by the tip end portion 61 of the spring member 60 and the rising end face 15 and the pressing face 72 is kept to be separated from the other end portion 33 of the main shaft 31. Consequently, the reliability of tilt adjustment is improved. When the head screw 70 is rotated in the forward direction to lower the other end portion 33 of the main shaft 31, the pressing face 72 of the head screw 70 functions to press the other end portion 33 of the main shaft 31 against the rising end face 15, thereby increasing the frictional force exerted between the rising end face 15 and the other end portion 33 of the main shaft 31. At this time, the rotation of the head screw 70 for lowering the other end portion 33 of the main shaft 31 is manually performed, and hence there never arises a situation where the increase of the frictional force causes the other end portion 33 of the main shaft 31 to be pressingly held and fixed by the pressing face 72 and the rising end face 15.

The above is applicable also to the other tilt adjusting mechanisms 82 and 83. In FIGS. 4 and 5, elements identical or corresponding to those which have been described with reference to FIGS. 1 to 3 are denoted by the same reference numerals in order to simplify the description.

As described above, according to the invention, tilt adjustment can be performed by using the means for finely adjusting the tilt of the guide shaft such as the main shaft and the sub shaft with respect to the support frame. Furthermore, a tilt adjusting mechanism can be configured without using an expensive part, and therefore it is possible to economically provide a tilt adjusting mechanism and hence a pickup device. Moreover, the reliability of tilt adjustment can be improved.

What is claimed is:

1. A pickup device comprising:
   a movable frame that holds a pickup;
   a guide shaft that guides travelling of said movable frame in directions along which said movable frame approaches and separates from a disk table; and
   a tilt adjusting mechanism including;
      a flat rising end face that is disposed on a support frame and that is perpendicular to a plate face of said support frame,
      a spring member that is held by said support frame, that is contacted at a straight tip end portion to an end portion of said guide shaft to elastically urge the end portion of said guide shaft in an upward direction along which the end portion separates from the plate face of said support frame,
      a head screw including a head, said head having a downward-tapered pressing face which is contacted to the end portion of said guide shaft that is elastically urged in the upward direction by said spring member, wherein said downward-tapered pressing face cooperates with the tip end portion and said rising end face of said support frame to pressingly hold the end portion of said guide shaft, wherein said downward-tapered pressing face enables the end portion of said guide shaft to be pressed down while causing the end portion to slide over said rising end face, and
      a tapped hole which is formed in said support frame, and into which said head screw is screwed, thereby supporting said head screw in parallel with said rising end face,
      wherein said tip end portion of said spring member straight elongates from a side of said head screw screwed into said tapped hole toward said rising end face while passing below said end portion of said guide shaft and inclined to be lowered as elongating, and a tilt angle of said tip end portion with respect to said rising end face is set to an angle at which said end portion of said guide shaft cannot be pressingly fixed by only said tip end portion and said rising end face.

2. A pickup device comprising:
   a movable frame that holds a pickup;
   a guide shaft that guides travelling of said movable frame in directions along which said movable frame approaches and separates from a disk table; and
   a tilt adjusting mechanism including;
      a flat rising end face that is disposed on a support frame and that is perpendicular to a plate face of said support frame,
      a spring member that is held by said support frame, that is contacted at a straight tip end portion to an end portion of said guide shaft to elastically urge the end portion of said guide shaft in an upward direction along which the end portion separates from the plate face of said support frame,
      a head screw including a head, said head having a downward-tapered pressing face which is contacted to the end portion of said guide shaft that is elastically urged in the upward direction by said spring member, wherein said downward-tapered pressing face cooperates with the tip end portion and said rising end face of said support frame to pressingly hold the end portion of said guide shaft, wherein said downward-tapered pressing face enables the end portion of said guide shaft to be pressed down while causing the end portion to slide over said rising end face, and
      a tapped hole which is formed in said support frame, and into which said head screw is screwed, thereby supporting said head screw in parallel with said rising end face,
   wherein said tip end portion of said spring member straight elongates from a side of said rising end face toward said head screw screwed into said tapped hole while passing below said end portion of said guide shaft and inclined to be lowered as elongating.

* * * * *